US007616551B2

(12) United States Patent
Zhang et al.

(10) Patent No.: US 7,616,551 B2
(45) Date of Patent: Nov. 10, 2009

(54) MOLECULAR OPTOELECTRONIC MEMORY DEVICE

(75) Inventors: Sean Ziao-an Zhang, Sunnyvale, CA (US); Heon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1075 days.

(21) Appl. No.: 10/721,574

(22) Filed: Nov. 25, 2003

(65) Prior Publication Data

US 2005/0111341 A1    May 26, 2005

(51) Int. Cl.
*G11B 7/00* (2006.01)
(52) U.S. Cl. ...................................... 369/126
(58) Field of Classification Search ................ 369/126; 257/40; 204/165
See application file for complete search history.

(56) References Cited

U.S. PATENT DOCUMENTS

| | | | | |
|---|---|---|---|---|
| 5,331,183 A | * | 7/1994 | Sariciftci et al. | 257/40 |
| 6,125,095 A | * | 9/2000 | Gemma et al. | 369/126 |
| 6,947,311 B2 | * | 9/2005 | Berner et al. | 365/151 |
| 6,970,413 B2 | * | 11/2005 | Gibson et al. | 369/126 |
| 7,179,534 B2 | * | 2/2007 | Forrest et al. | 428/411.1 |
| 7,214,956 B2 | * | 5/2007 | Imai | 250/591 |
| 2003/0017261 A1 | * | 1/2003 | Han et al. | 427/162 |
| 2003/0022414 A1 | * | 1/2003 | Lian et al. | 438/80 |

* cited by examiner

*Primary Examiner*—Joseph Feild
*Assistant Examiner*—Joseph Haley
(74) *Attorney, Agent, or Firm*—Myers Bigel Sibley & Sajovec

(57) ABSTRACT

Method for employing optical state-change organic polymer films as information-storage layers in optoelectronic, high-density memories, and high-density optoelectronic memories produced by the method. In certain embodiments, the optical state-change organic polymer films can be manufactured to exhibit two different, stable optical states, one transparent, and one light-absorbing and/or light-reflecting, that can be locally, stably, and reversibly induced by application of an electrical field. In various embodiments, information is digitally encoded in an information-storage layer as bits, the value of each bit represented by the optical state of an area of the information-storage layer corresponding to the bit. In various embodiments, the optical state of a small region of the information-storage layer can be determined by exposing the small region to visible light, and determining whether or not a photodiode layer in an information-storage medium below the information-storage layer generates an electrical current in response to illumination.

12 Claims, 10 Drawing Sheets

MOLECULAR OPTOELECTRONIC MEMORY DEVICE

TECHNICAL FIELD

The present invention is related to memory devices and, in particular, to an optoelectronic memory device that uses, as a storage medium, an organic-polymer film that can be locally and reversibly switched between a transparent state to a colored, visible-light-absorbing-and/or-reflecting state by a change in the direction of an applied electrical field.

BACKGROUND OF THE INVENTION

Significant research and development effort is currently being applied to various types of extremely dense electronic, magnetic, and optical memories, and various hybrid-technology memories. While the sizes of storage media regions representing stored bits and the speeds of memory access of traditional, magnetic disk memories and electronic memories have steadily decreased during the last 40 years, newer types of extremely dense memories may soon overtake traditional memories in cost efficiency, durability, stored information stability, and other desirable characteristics. Many of the newer types of memories are based on semiconducting organic polymer films and other new materials. Relatively inexpensive, extremely dense, fuse-type memories have been successfully developed from one class of organic semiconducting polymers. In these memory devices, a large current may be used to write the memory, and a lower current may then be used to read the memory. Although fuse-type organic-polymer-film-based memories may be useful and cost effective on a number of applications, including digital-camera memories, researchers and developers of high-density memories continue to recognize the need for new, stable, extremely dense, rewritable memory devices.

SUMMARY OF THE INVENTION

Various embodiments of the present invention provide an optoelectronic memory that includes an information-storage medium that can be locally and reversibly switched between at least two optical states by application of an electrical field and a detection means that detects and reports the optical states of regions of the information-storage medium. In one embodiment of the present invention, an optical state-change organic polymer film is employed as an information-storage layer within the information-storage medium.

DETAILED DESCRIPTION OF THE INVENTION

Figure 1:
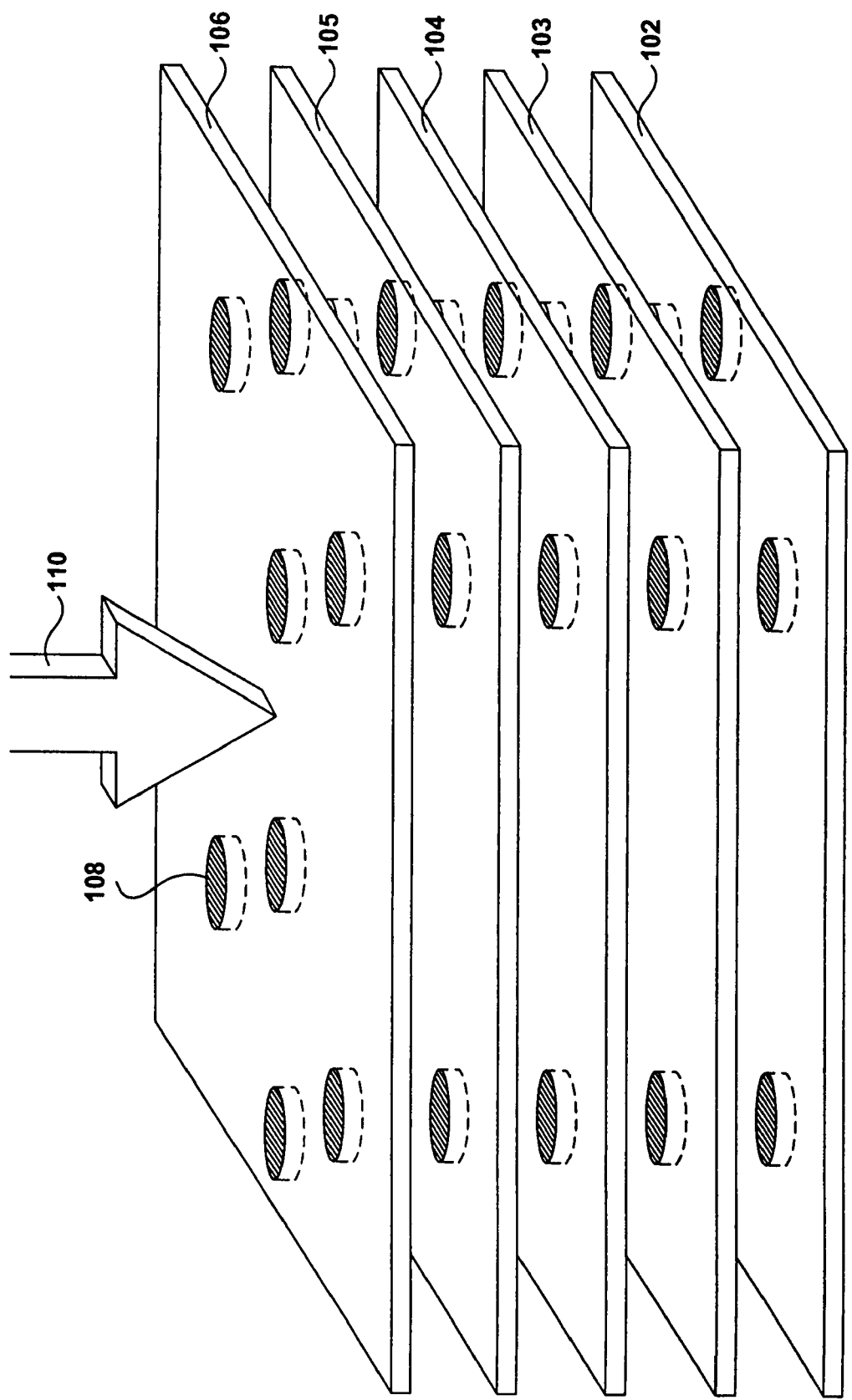
FIG. 1 abstractly illustrates a small, rectangular section of a larger, two-dimensional, optical state-change organic-polymer film.

Various embodiments of the present invention employ different types of acetylene-coupled, highly conjugated, two-dimensional polymers of organic dye subunits that include a relatively rigid, planar network of plate-like, fused-ring dye subunits with interleaving, acetylene-linked, substituted phenyl components that may be rotated, under the influence of an applied electrical field, with respect to the relatively rigid, fused-ring network. When the rotatable, phenyl components of the two-dimensional film are coplanar with the fused-ring-based, relatively rigid, planar network, the entire two-dimensional polymer is fully conjugated, with concomitant delocalization of $\pi$ electrons throughout the polymer. In a fully conjugated two-dimensional polymer, the molecular-orbital bands are relatively broad, in energy, and relatively closely spaced, and there is a relatively small energy gap between the highest occupied molecular orbital ("HOMO") and the lowest unoccupied molecular orbital ("LUMO"). The components of the two-dimensional polymer may be designed so that this relatively low energy gap between the HOMO and LUMO corresponds to absorption of visible light of a particular color, or range of colors. However, when an electrical field is applied to rotate the phenyl components with respect to the relatively rigid, fused-ring-based network within the two-dimensional polymer, full conjugation of $\pi$ electrons within the two-dimensional polymer is disrupted, resulting in narrowing of molecular orbital bands of the two-dimensional polymer and an increase in the energy gap between the HOMO and LUMO. This results in essentially blue-shifting the absorption characteristics of the two-dimensional polymer and, when the energy gap corresponds to ultra-violet or more energetic wavelengths, results in a transparent film.

A locally applied electrical field may be used to locally and reversibly change the organic-polymer film between a colored, visible light-absorbing state and a transparent state. The optical states of the organic polymer are stable over long periods of time, even when the applied electrical field is removed. Therefore, the two-dimensional polymer may be used as an information-storage within an information-storage medium, with the transparent state representing one binary value, such as the binary value "0," and the colored, visible-light-observing state representing the opposite binary value, for example, the binary value "1." Because the optical states of the polymer depend on molecular-subunit orientations within the two-dimensional information-storage organic-polymer film, the size of a discrete, binary-value-storing region of the memory polymer is limited only by the smallest size over which an electrical field or optical illumination can be reproducibly applied by an optoelectronic-mechanical read/write device.

An optoelectronic-mechanical read/write device can be used to write binary values into small areas of the information-storage layer that represent individual bits by applying an electrical field in a first direction to write "0" bit values by inducing transparent optical states and applying an electrical field in an opposite direction to write "1" bits by inducing visible-light-absorbing-and/or-reflecting optical states. A photodiode layer beneath the information-storage layer within an information-storage medium allows the contents of the information-storage layer to be read. When visible light is guided through the read/write device onto the information-storage medium, the light is absorbed by visible-light-absorbing-and/or-reflecting regions and transmitted by transparent regions of the information-storage layer. The underlying photodiode layer is not activated below visible-light-absorbing-and/or-reflecting regions of the information-storage polymer, but is activated by light transmitted to transparent regions of the information-storage polymer. When activated, the photodiode layer produces an electric current, and thus the stored information within the information-storage layer can be transformed into digital electric signals.

FIG. 1 abstractly illustrates a small, rectangular section of a larger, two-dimensional, optical state-change organic-polymer film. As shown in FIG. 1, the optical state-change organic polymer material is composed of numerous, parallel, sheet-like two-dimensional organic polymers 102-106. The two-dimensional sheet-like organic polymers include relatively rigid, planar networks in which rotatable molecular components, such as rotatable molecular component 108, occur at regular intervals in both dimensions. These rotatable, molecular components may be rotationally oriented to be coplanar with the relatively rigid, two-dimensional organic polymer sheets, as shown in FIG. 1, when electrical field, represented by arrow 110 in FIG. 1, is applied in a particular direction.

Figure 2:
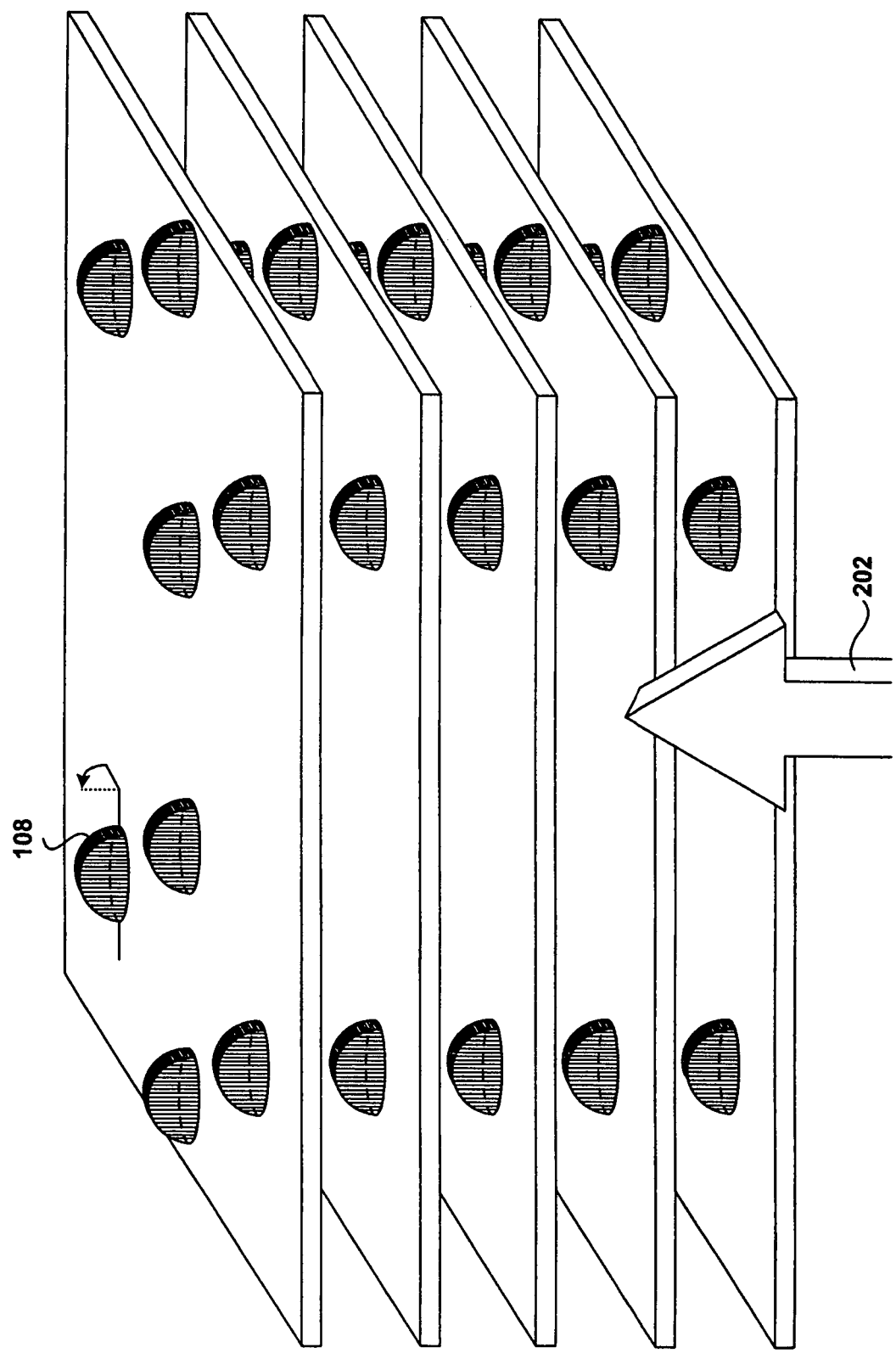
FIG. 2 shows the two-dimensional, optical state-change organic-polymer film shown in FIG. 1 when the direction of the applied electrical field is reversed.

FIG. 2 shows the two-dimensional, optical state-change organic-polymer film shown in FIG. 1 when the direction of the applied electrical field is reversed. As shown in FIG. 2, when the direction of the applied electrical field, represented by arrow 202, is reversed, the rotatable molecular components, such as rotatable molecular component 108, are rotated approximately 90 degrees with respect to the planes of the relatively rigid, two-dimensional optical state-change organic polymer. The two-dimensional optical state-change organic polymer may be in a colored, visible-light-absorbing-and/or-reflecting optical state when the rotatable molecular components are parallel with the two-dimensional polymer sheets, as shown in FIG. 1, and may be in a transparent optical state when the rotatable molecular components are approximately perpendicular to the plane of the two-dimensional organic polymer sheets, as shown in FIG. 2.

It should be noted that the directions of the applied electrical fields used to rotate rotatable molecular components of the two-dimensional polymers may be coplanar with the two-dimensional polymers, as shown in FIGS. 1-4, may be approximately orthogonal to the planes of the two-dimensional polymers, or may be applied at various angles with respect to the planes of the two-dimensional polymers, depending on the chemical nature and relative locations of the rotatable molecular components within the two-dimensional optical state-change organic polymer. In the described optoelectronic memory devices that represent various embodiments of the present invention, an orthogonal application of the electrical fields serves to rotate the rotatable molecular components.

Figure 3:
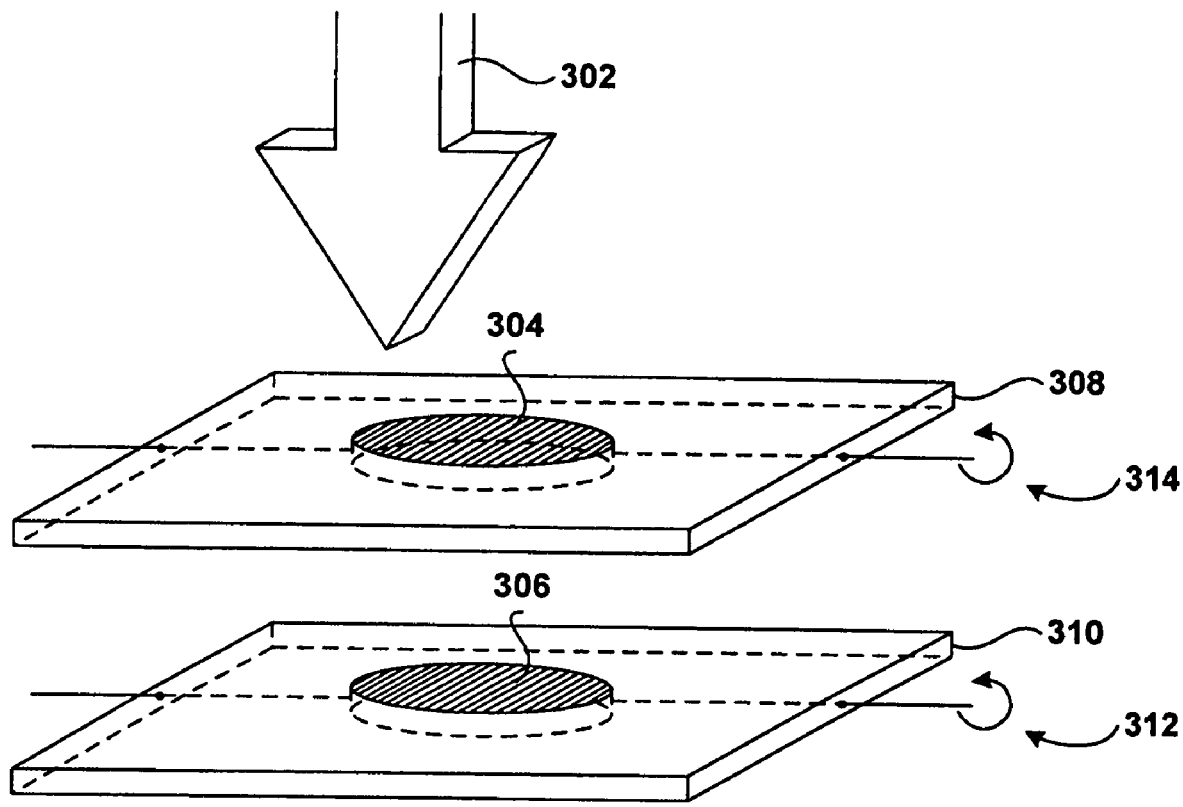
FIGS. 3 and 4 illustrate rotation of rotatable molecular components of the two-dimensional, optical state-change organic-polymer film under an applied electrical field at a larger scale.
Figure 4:
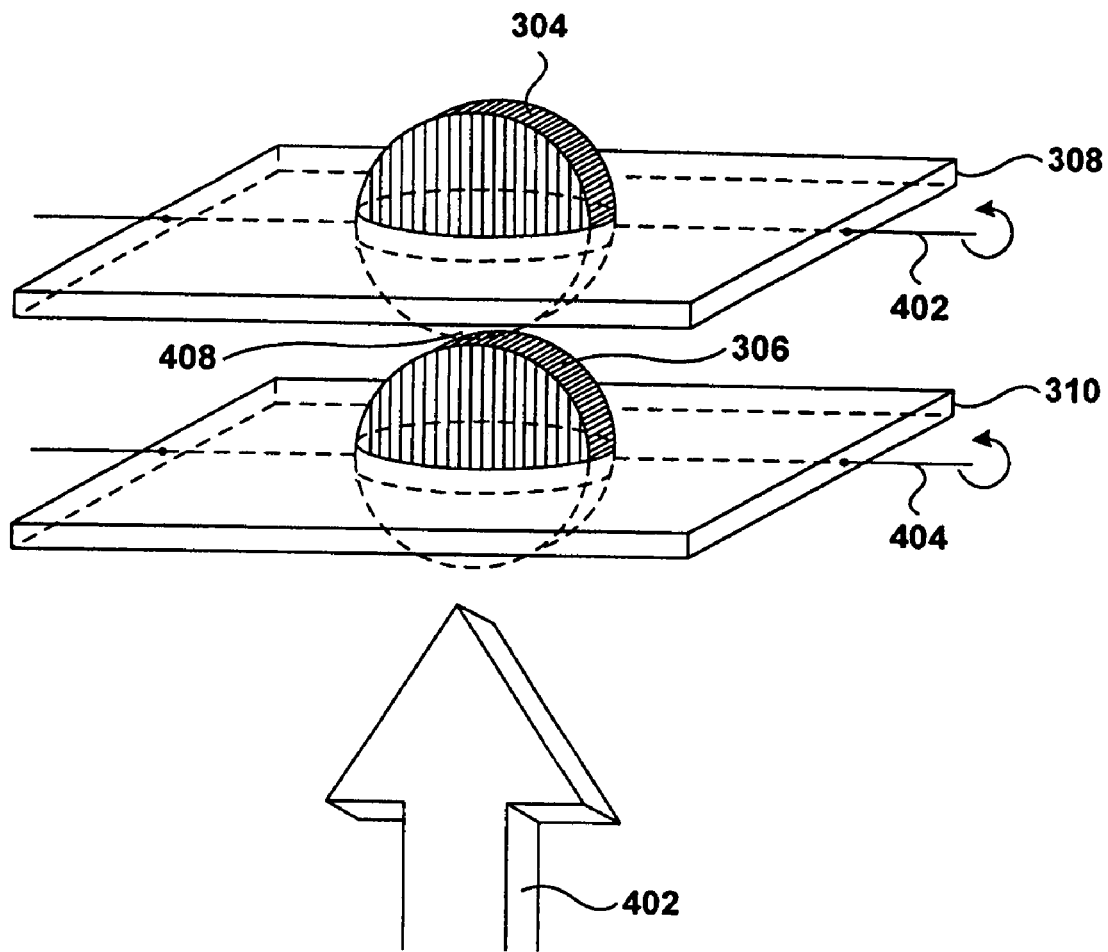

FIGS. 3 and 4 illustrate rotation of rotatable molecular components of the two-dimensional, optical state-change organic-polymer film under an applied electrical field at a larger scale. In FIG. 3, the applied electrical field 302 has caused the rotatable molecular components 304 and 306, to be oriented coplanar with the planes of the two-dimensional organic polymers 308 and 310 in which they are included. The applied electrical field 302 serves to rotate the rotatable molecular components into a coplanar position. However, when the field is then removed, the rotatable molecular components are relatively stably fixed in the coplanar orientation as a result of molecular interactions between chemical substituents of the rotatable molecular components and the relatively rigid, static portion of the two-dimensional optical state-change organic polymers. When, however, the electrical field is reversed, as shown by arrow 402 in FIG. 4, rotatable molecular components 304 and 306 rotate about horizontal rotation axes 402 and 404, respectively, to positions in which the planes of the rotatable molecular components are approximately perpendicular to the plane of the relatively rigid, two-dimensional organic polymer sheets 308 and 310. In FIG. 3, the applied electrical field 302 would, without various molecular constraints, cause the rotatable molecular components 304 and 306 to rotate a full 180 degrees about rotation axes 312 and 314, respectively, to end up approximately orthogonal to the relatively rigid, two-dimensional organic polymer planes 308 and 310, respectively. However, various intramolecular forces conspire to lock the rotatable, molecular components 304 and 306 into the coplanar positions shown in FIG. 3. In the stacked two-dimensional polymers within the two-dimensional optical state-change organic-polymer film, interactions between substituents of the rotatable, phenyl components of one two-dimensional polymer with substituents of one or more rotatable molecular components of a lower or higher, neighboring two-dimensional polymer and/or with chemical groups incorporated into the relatively rigid, fused-ring two-dimensional network of the two-dimensional polymer or lower or higher neighboring two-dimensional polymers conspire to stably lock the rotatable molecular components into approximately orthogonal positions with respect to the planes of the two-dimensional polymers. The intramolecular and intermolecular interactions that lock the rotatable molecular components into rotational orientations may include hydrogen bonding, dipole-dipole interactions, interactions based on van der Waals forces, polarizeability of relatively weakly bonded electrons, steric repulsions, and other such forces that serve to constrain the possible rotational confirmations of the rotatable molecular components within the stacked two-dimensional polymers that together compose an organic-polymer-based optical state-change film.

Figure 5:
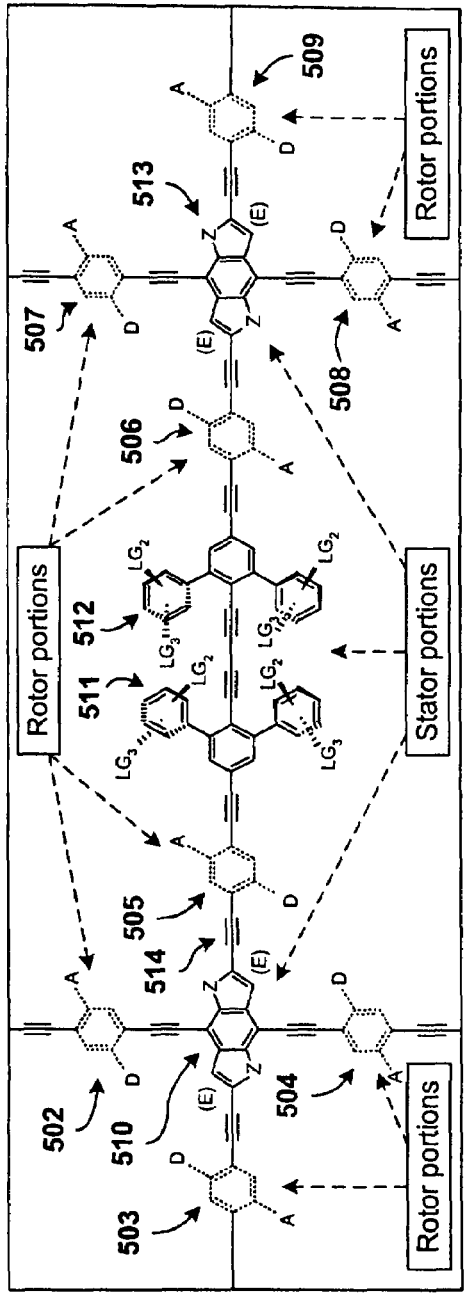
FIGS. 5 and 6 illustrate the coplanar and approximately 90-degree-from-coplanar rotational states of a two-dimensional optical state-change organic polymer, an acetylene-inked, indacene-and-substituted-benzene polymer network, at the chemical-subunit level.
Figure 6:
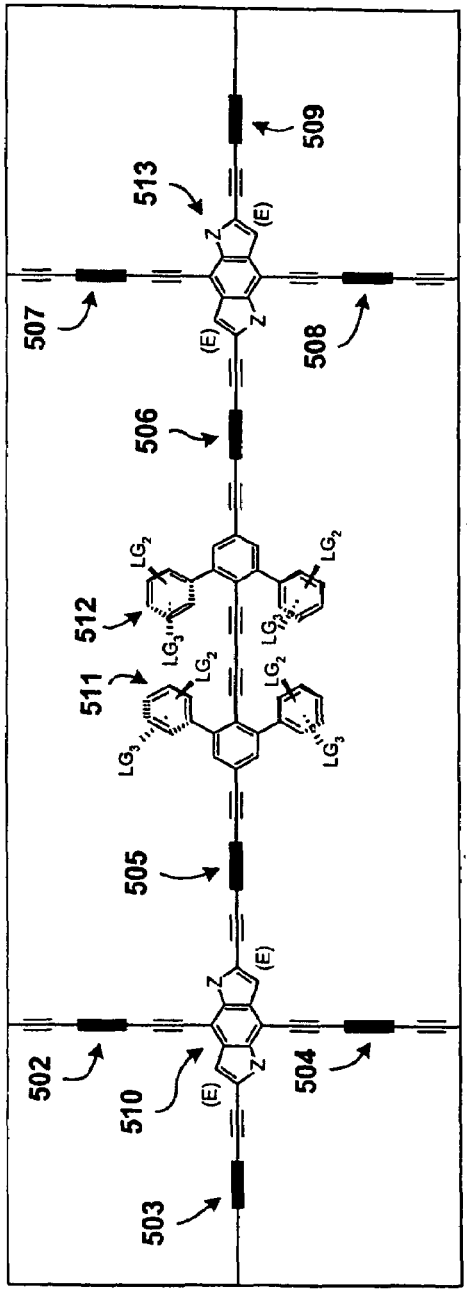

FIGS. 5 and 6 illustrate the coplanar and approximately 90-degree-from-coplanar rotational states of a two-dimensional optical state-change organic polymer, an acetylene-inked, indacene-and-substituted-benzene polymer network, at the chemical-subunit level. As shown in FIG. 5, in the visible-light-absorbing-and/or-reflecting, coplanar state, the rotatable phenyl components 502-509 that are rotatably linked to larger, fused-ring dye subunits 510-513 through acetylene linkages, such as acetylene linkage 514, are coplanar with the fused-ring, relatively rigid, planar subunits 510-513. The rotatable phenyl components 502-508 have asymmetric substituents designated in FIG. 5 by the letters "A" and "D." These asymmetrical substituents introduce a relatively large, electrical dipole within the rotatable, phenyl subunits, making the rotatable phenyl subunits susceptible to orientation by applied electrical fields. The coplanar rotational orientations of the rotatable phenyl subunits 502-509 in FIG. 5 are stabilized by various intermolecular interactions, including dipole-dipole interactions, hydrogen bonding, and other such attractive forces. In the coplanar configuration illustrated in FIG. 5, the two-dimensional polymer is essentially fully conjugated, with double and triple carbon bonds alternating with single carbon bonds along the horizontal and vertical backbones of the two-dimensional polymer. In this fully conjugated state, the molecular orbital bands that describe the electronic state of the polymer are broad, and relatively closely spaced. There is a small energy gap between the highest occupied molecular orbital ("HOMO") and the lowest unoccupied molecular orbital ("LUMO"). This relatively small energy gap between the HOMO and LUMO, in turn, represents the minimum energy for an electronic transition within the two-dimensional optical state-change organic polymer in response to absorption of a photon of visible light. The two-dimensional optical state-change organic polymer may be chemically tailored in order to produce an organic film with specific light-absorption characteristics and a characteristic color.

When an electrical field of opposite polarity to that applied in order to establish the coplanar configuration shown in FIG. 5 is applied to the two-dimensional optical state-change organic polymer, the rotatable phenyl subunits 502-509 rotate approximately 90 degrees with respect to the relatively rigid, fused-ring subunits 510-513, as shown in FIG. 6. In this rotated configuration, the two-dimensional optical state-change organic polymer is no longer fully conjugated, since the planer, π bonds of the rotatable molecular components 502-509 are no longer coplanar with the conjugated planar π-bonding molecular orbitals of the relatively rigid, two-dimensional optical state-change polymer network that includes fused-ring subunits 510-513.

As discussed above, with reference to FIGS. 3-4, the two-dimensional optical state-change organic polymer is bistable. Although rotation of the rotatable phenyl subunits 502-509 is induced by application of an electrical field, once rotated to the coplanar or approximately perpendicular positions shown in FIGS. 5 and 6, respectively, the rotatable phenyl subunits remain fixed in either the coplanar or approximately perpendicular positions for long periods of time, even when application of the electrical field is discontinued. The two, bistable orientations of the rotatable phenyl subunits arise from two different sets of intramolecular and intermolecular actions between phenyl substituent groups and substituent groups of other rotatable phenyl subunits and other chemical components of the two-dimensional optical state-change organic polymer. Moreover, as discussed above, the bistable states are locally stable within extremely small regions of the optical state-change organic polymer, including regions of nanometer dimensions. Finally, the optical contrast between the two bistable states can be arranged to be extremely high, facilitating accurate and robust access to stored information, as discussed below.

Figure 7:
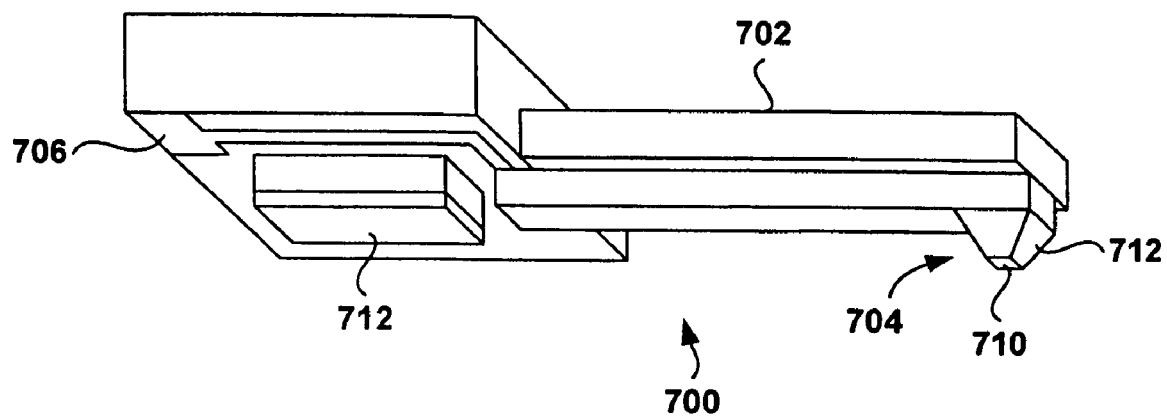
FIG. 7 illustrates a tiny optoelectronic-mechanical read/write device that can be used, in combination with an information-storage medium that includes a layer of a two-dimensional, optical state-change organic-polymer film discussed above with reference to FIGS. 1-6.

FIG. 7 illustrates a tiny optoelectronic-mechanical read/write device that can be used, in combination with an information-storage medium that includes a layer of a two-dimensional, optical state-change organic-polymer film discussed above with reference to FIGS. 1-6. The read/write device 700 can be produced from a suitable substrate material using photolithographic processes employed for manufacturing complex, three-dimensional circuitry in integrated circuits. The read/write device includes a cantilever arm 702 that ends in an optoelectronic tip 704. The optoelectronic tip 704 can direct either a tiny, nanometer-sized electrical field in a direction perpendicular to the cantilever arm 702 when a voltage potential is applied to the signal line 706 interconnecting external circuitry with a metallic sheath forming at least the lower surface of the cantilever arm 802 and the optoelectronic tip 704, or may direct a tiny, intense beam of visible light in a direction perpendicular to the cantilever arm 702 through a nanometer-sized aperture 710 of the electrical optical tip when application of an electrical current to a laser diode causes an intense beam of visible light to be directed through the hollow interior tube of the cantilever arm and deflected in a perpendicular direction by the inclined surfaces of the optoelectronic tip 712.

Figure 8:
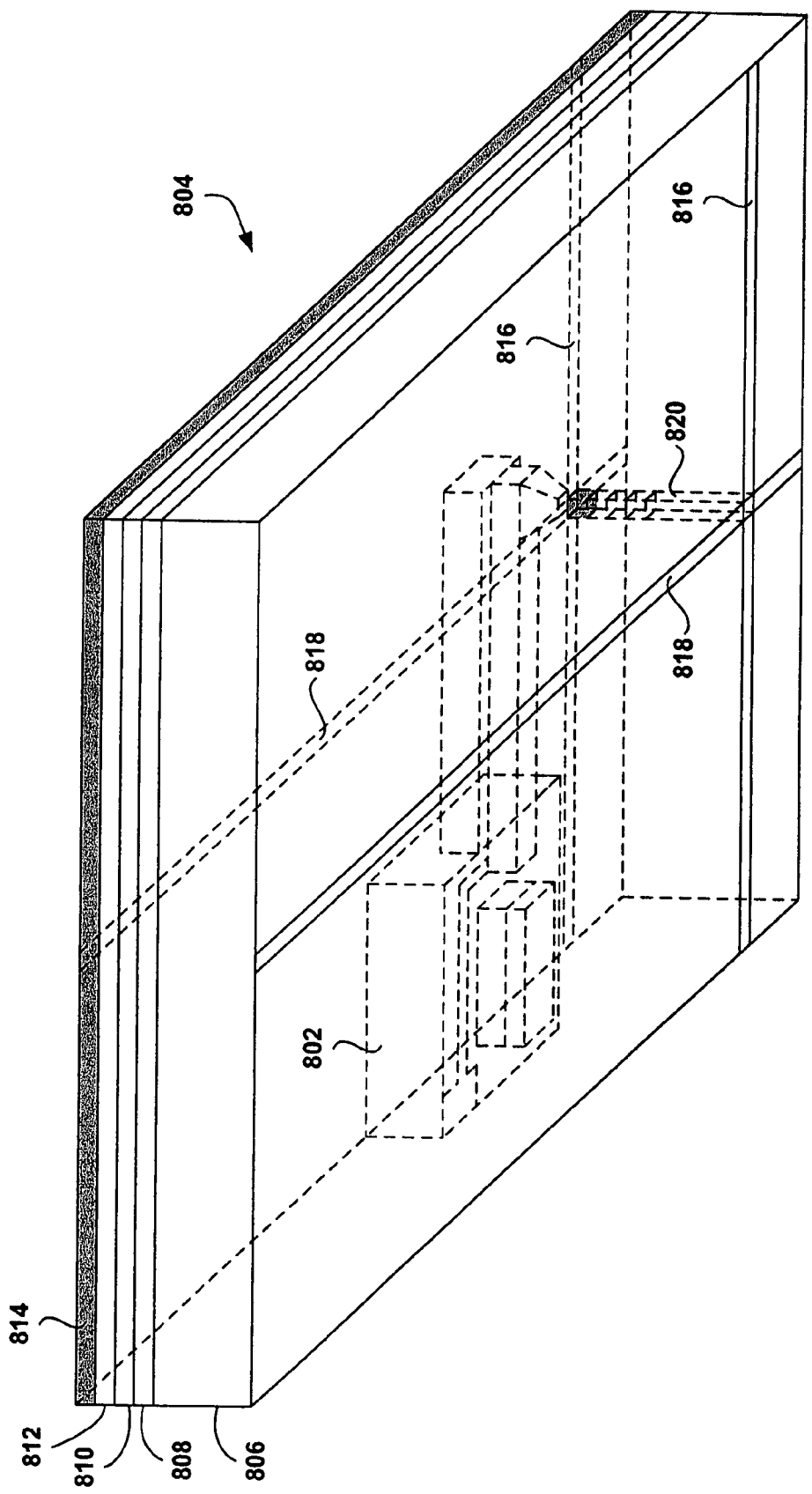
FIG. 8 illustrates the information-storage medium and operation of the optoelectronic-mechanical read/write device illustrated in FIG. 7.

FIG. 8 illustrates the information-storage medium and operation of the optoelectronic-mechanical read/write device illustrated in FIG. 7. In FIG. 8, the optoelectronic-mechanical read/write device 802 is shown above and behind a rectangular section of a information-storage medium 804. The information-storage medium comprises a substrate 806, such as silicon or silicon dioxide, on top of which four different organic-polymer films are layered. The first two organic-polymer films 808 and 810 are n-type and p-type organic-polymer semiconducting films that together form a pn-junction photodiode film. The photodiode film generates an electrical current when exposed to visible light, and may generate visible light when electrical current is passed through the photodiode film. It is the former characteristic of the photodiode film that is employed in the information-storage medium. Next, a conducting organic-polymer-based or conducting inorganic film 812 serves as a transparent electrode 812. Finally, the two-dimensional optical state-change organic-polymer film 814 discussed above with reference to FIGS. 1-6 is layered above the transparent electrode film 812 to form the information-storage layer of the information-storage medium above which the optoelectronic-mechanical read/write device is positioned. As shown in FIG. 8, at a given position with respect to the information-storage medium, in some embodiments indexed by a horizontal position 816 and a vertical position 818 with respect to a rectilinear coordinate grid, the electrical-optical-mechanical read/write device may address a small column 820 of the information-storage medium either through a tiny, nanometer-dimensioned electrical field generated by application of a voltage potential to the signal line incorporated in the read/write device (706 in FIG. 7), or by a tiny, visible-light beam generated by electrical activation of the laser diode (712 in FIG. 7). Either the information-storage medium may be accurately moved and positioned with respect to the read/write device, or the read/write device may be moved accurately with respect to the information-storage medium so that a two-dimensional grid of nanometer-dimensioned columns, such as column 820, may serve as separately addressable memory elements, each stably holding a binary "0" or binary "1" value.

Figure 9:
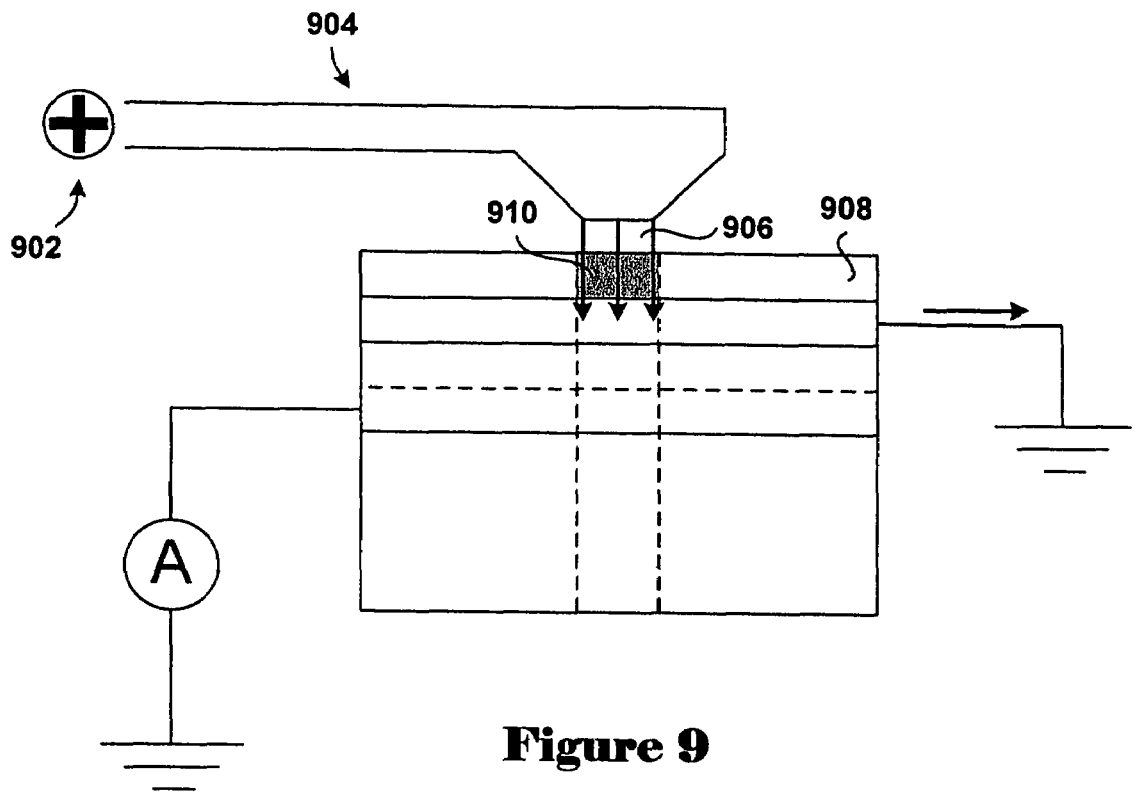
FIGS. 9-12 illustrate writing a binary value into an information-storage medium.
Figure 10:
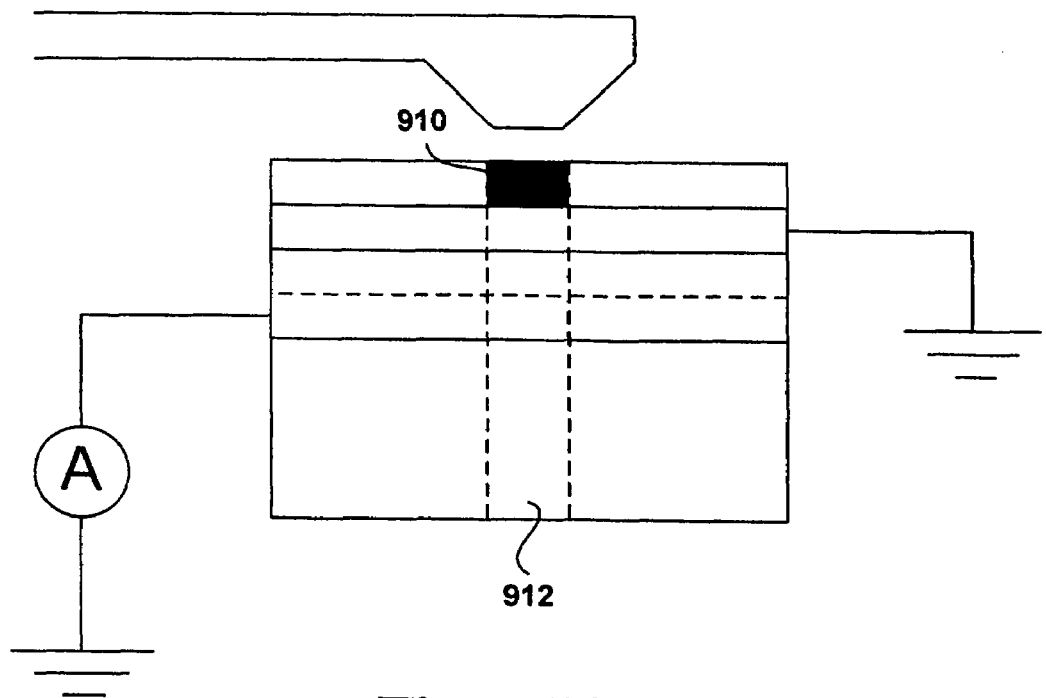

FIGS. 9-12 illustrate writing a binary value into an information-storage medium. For the sake of discussion, the visible-light-absorbing-and/or-reflecting, colored optical state of the two-dimensional optical state-change organic-polymer-based film is considered to represent the binary value "1," while the transparent state represents the binary value "0." However, an opposite convention may also be employed. In FIG. 9, voltage 902 is applied to the electrical-optical-mechanical read/write device 904 in order to project a narrow electrical field 906 through the two-dimensional optical state-change organic-polymer-based film 908, rotating the rotatable molecular components into approximately perpendicular positions with respect to the plane of the relatively rigid two-dimensional organic-polymer network and inducing the colored, visible-light-absorbing-and/or-reflecting optical state within a small element 910 of the information-storage layer. As shown in FIG. 10, the colored, visible-light-absorbing-and/or-reflecting state 910 is stable, and is maintained when the applied voltage has been removed from the electrical-optical-mechanical read/write device. Thus, application of an electrical field in a first direction has resulted in storage of the binary value "1" within a small column of the information-storage medium 912.

Figure 11:
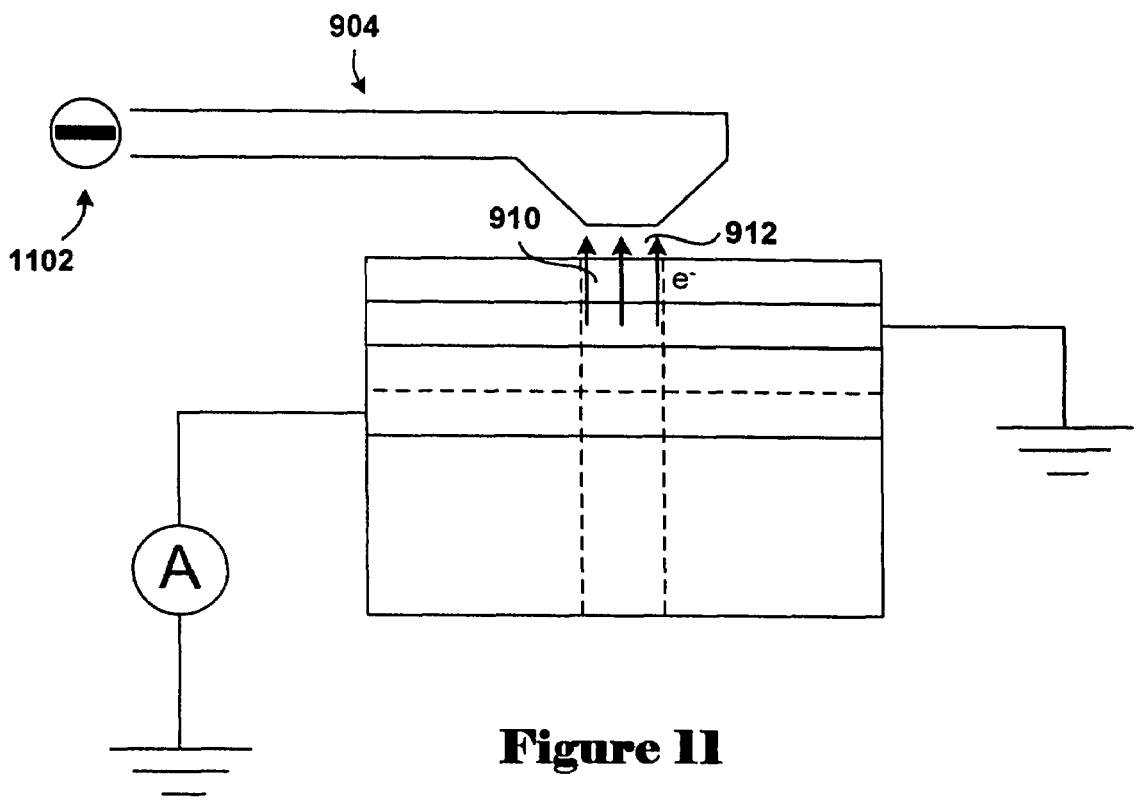
Figure 12:
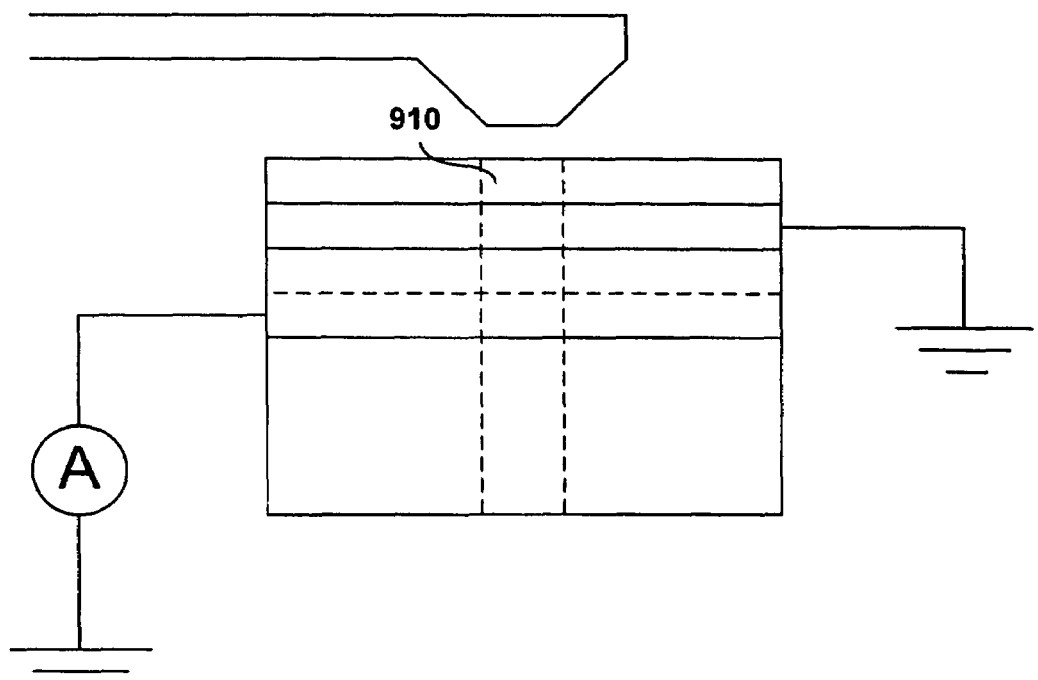

In FIG. 11, voltage of an opposite polarity is applied by the electrical-optical-mechanical read/write device 904 to the element 910 of the information-storage medium. The applied electrical field 912, opposite in polarity from the field applied in FIG. 9, induces the coplanar, transparent optical state within the element 910 of the information-storage medium. As shown in FIG. 12, the transparent state of the element 910 of the information-storage medium is stable, even after the applied electrical field is removed. Thus, as shown in FIGS. 9-12, electrical fields applied through the electrical-optical-mechanical read/write device can reversibly write the binary values "1" and "0" to particular discrete information-storing elements within the information-storage medium defined by the position of the electrical-optical-mechanical read/write device with respect to the information-storage medium.

Figure 13:
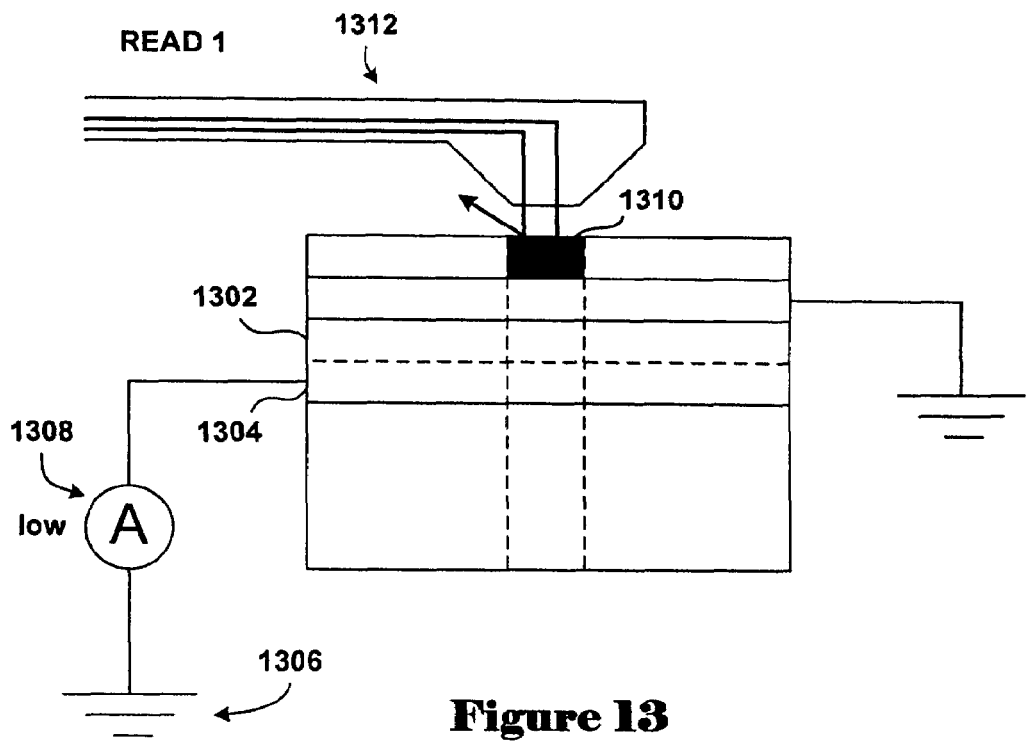
FIGS. 13-14 illustrate reading of the information stored within an information-storage medium by the electrical-optical-mechanical read/write device.
Figure 14:
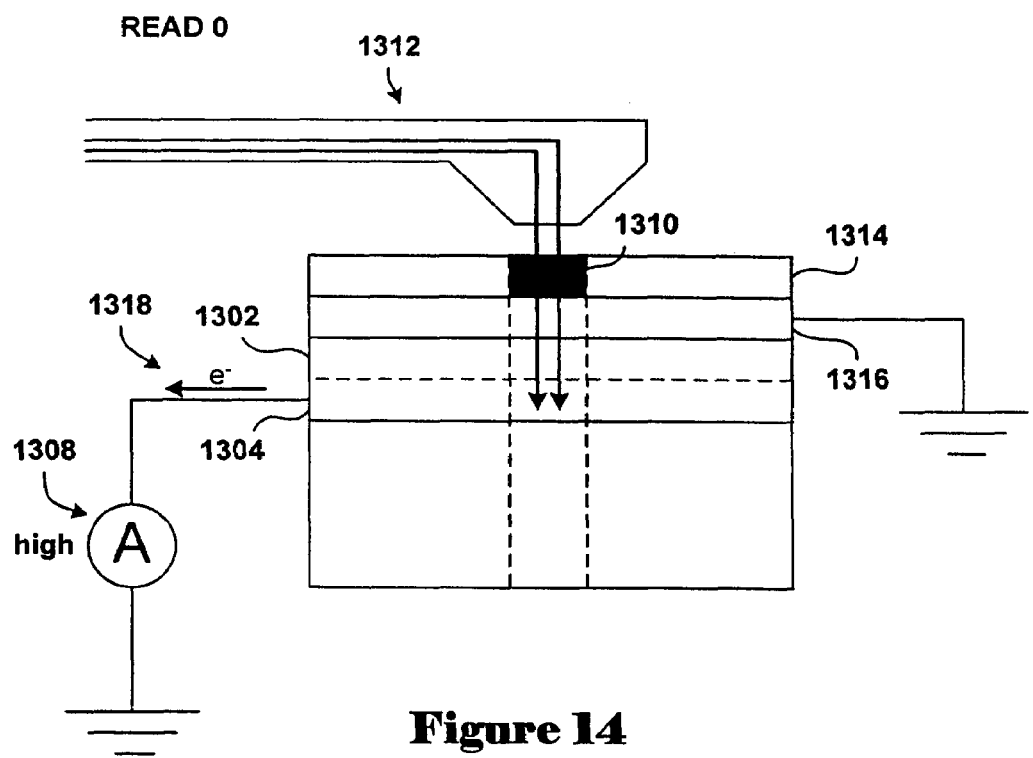

FIGS. 13-14 illustrate reading of the information stored within an information-storage medium by the electrical-optical-mechanical read/write device. As shown in FIG. 13, the photodiode layers 1302 and 1304 of the information-storage medium are electrically interconnected to ground 1306 through a current-measuring circuit 1308. When visible light is projected through the electrical-optical-mechanical read/write device onto a small-information-storing element of the information-storage medium 1310, the visible light is absorbed, reflected, or both absorbed and reflected by the optical state-change organic-polymer-based film in the colored, visible-light-absorbing-and/or-reflecting state that represents the binary value "1." Thus, a low measured current 1308 from the photodiode layer during visible-light illumination of an information-storage element within the information-storage medium indicates that the electrical-optical-mechanical read/write device 1312 is positioned over a colored-state region of the two-dimensional optical state-change organic-polymer-based film. In contrast, as shown in FIG. 14, when the electrical-optical-mechanical read/write device 1312 illuminates a transparent-state region 1310 of the optical state-change organic-polymer-based film, the illuminating visible light is transmitted through the information-storage layer 1314 and the transparent electrode layer 1316 into the photodiode layers 1302 and 1304. In response to illumination by the visible light, the photodiode layers 1302 and 1304 generate an electric current 1318 which is sensed by the current-sensing circuit 1308. In summary, under visible-light illumination, an information-storage element of the information-storage medium generates a low current when in the colored optical state representing the binary value "1," and generates a relatively high current when in the transparent optical state representing the binary value "0."

Although the present invention has been described in terms of a particular embodiment, it is not intended that the invention be limited to this embodiment. Modifications within the spirit of the invention will be apparent to those skilled in the art. For example, as discussed above, many different types of information-storage devices may be constructed in which the electrical-optical-mechanical read/write device is moved relative to the information-storage medium, the information-storage medium is moved relative to the electrical-optical-mechanical read/write device, or both the electrical-optical-mechanical read/write device and the information-storage medium are moved in order to position the read/write device accurately over the information-storing elements of the information-storage medium defined by the relative positions of the read/write device and the information-storage medium. Many different two-dimensional optical state-change organic-polymer-based films may be developed in order to provide bistable information-storing phases with different, desirable characteristics. Different embodiments of the optical state-change organic-polymer-based film may contain additional chemical components, such as spacers, radiation-transfer components, and components that alter the electronic states of the material. As discussed above, chemical modification of the polymer may shift the color of the colored state to a desired color or range of colors, and shifts the energy gap between the HOMO and LUMO such that the other bistable state is transparent or colored, depending on the desired characteristics of the system. As long as the one of the bistable states is transparent to electromagnetic radiation having a first frequency range, and blocks transmission of electromagnetic radiation of a second frequency range, binary information stored in bistable states can be accessed and transformed into a digital electronic signal. Alternatively, a digital optical signal can be directly obtained, and processed via optical computing. Chemical modification of the organic polymer film may lead to different optical-state stabilities, and to modification of various other characteristics, including stability or lack of stability with regard to various environmental influences, including temperature, exposure to oxidizing or reducing conditions, exposure to high-intensity electrical or magnetic fields, and other such environmental influences. In a preferred embodiment, the optical state-change organic-polymer-based film is neither oxidized nor reduced when exposed to the electrical fields of intensities required to generate sufficient photodiode current for measuring the information state of discrete information-storing elements within the information-storage medium. A information-storage device may include one or a great many electrical-optical-mechanical read/write devices, and may be incorporated within a huge potential variety of information-storage devices that may be produced by photolithographic methods or by larger-scale, traditional manufacturing methods. The visible-light source in the preferred embodiment is a laser diode, but many other types of visible-light sources may be used in alternative embodiments. Although binary information storage is employed in the described embodiments, the optoelectronic memories may use additional stable optical states to encode information elements with 3 or more possible values, leading encoding of information in numbers with larger magnitude bases.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optoelectronic memory device, comprising:
    an information-storage medium that includes an information-storage layer that can be locally and reversibly switched between at least two optical states by application of electrical fields to rotatable molecular components contained therein;

a detector layer within the information-storage medium that can detect whether or not an applied electromagnetic radiation beam is transmitted through the information-storage medium at different positions of the information-storage medium; and a read/write device that applies electrical fields to write information into the information-storage layer and that applies electromagnetic-radiation beams in order to read information stored in the information-storage layer; and wherein the information-storage layer comprises a two-dimensional optical state-change organic polymer having a relatively rigid, fused-ring, organic-dye-based planar network and acetylene-linked rotatable molecular components.

2. The optoelectronic memory device of claim 1 wherein the rotatable molecular components can be rotational oriented by application of an electrical field thereto.

3. The optoelectronic memory device of claim 2 wherein the rotatable molecular components can be stably oriented in a rotational position coplanar with the relatively rigid, fused-ring, organic-dye-based planar network, leading to a fully conjugated organic-dye-based two-dimensional polymer that absorbs and/or reflects electromagnetic radiation of a particular frequency range, and wherein the rotatable molecular components can be stably oriented in a rotational position approximately orthogonal to the relatively rigid, fused-ring, organic-dye-based planar network, leading to a not-fully conjugated organic-dye-based two-dimensional polymer that is transparent to electromagnetic radiation of the particular frequency range.

4. A method for storing a bit of information, the method comprising:

providing an optoelectronic memory device that includes an information-storage medium with an information-storage layer that can be locally and reversibly switched between at least two optical states by application of electrical fields to rotatable molecular components within the information-storage layer and that includes a detector layer within the information-storage medium that can detect whether or not an applied electromagnetic radiation beam is transmitted through the information-storage medium at different positions of the information-storage medium;

when the bit of information has a first binary value, applying an electrical field of a first polarity to a small region of the information-storage layer to induce the first optical state within that region;

when the bit of information has a second binary value, an electrical field of a second polarity to the small region of the information-storage layer to induce the second optical state within that region; and wherein the information-storage layer comprises a two-dimensional optical state-change organic polymer having a relatively rigid, fused-ring, organic-dye-based planar network and acetylene-linked rotatable molecular components.

5. The method of claim 4 further comprising:

subsequently illuminating a small region of the information-storage layer in order to access information stored in the information-storage layer by detecting whether or not the detector layer generates an electrical current in response to the illumination.

6. The method of claim 5 wherein the rotatable molecular components can be stably oriented in a rotational position coplanar with the relatively rigid, fused-ring, organic-dye-based planar network, leading to a fully conjugated organic-dye-based two-dimensional polymer that absorbs and or reflects electromagnetic radiation of a particular frequency range, and wherein the rotatable molecular components can be stably oriented in a rotational position approximately orthogonal to the relatively rigid, fused-ring, organic-dye-based planar network, leading to a not-fully conjugated organic-dye-based two-dimensional polymer that is transparent to electromagnetic radiation of the particular frequency range.

7. An optoelectronic memory device, comprising:

an information-storage medium having an information-storage layer therein that can be locally and reversibly switched between at least two optical states by application of an electric field thereto, said information-storage layer comprising a two-dimensional optical state-change organic polymer having relatively rigid, fused-ring, organic-dye-based planar network and acetylene-linked rotatable molecular components therein.

8. The memory device of claim 7, further comprising:

a detector layer within said information-storage medium that can detect whether or not an applied electromagnetic radiation beam is transmitted through the information-storage medium; and a read/write device configured to apply electrical fields while writing information into said information-storage layer and further configured to apply electromagnetic-radiation beams to said information-storage layer when reading information stored therein.

9. The memory device of claim 8, wherein the rotatable molecular components can be rotationally oriented by application of an electrical field thereto.

10. The memory device of claim 9, wherein the rotatable molecular components can be stably oriented in a rotational position coplanar with the relatively rigid, fused-ring, organic-dye-based planar network, leading to a fully conjugated organic-dye-based two-dimensional polymer that absorbs and/or reflects electromagnetic radiation of a particular frequency range, and wherein the rotatable molecular components can be stably oriented in a rotational position approximately orthogonal to the relatively rigid, fused-ring, organic-dye-based planar network, leading to a not-fully conjugated organic-dye-based two-dimensional polymer that is transparent to electromagnetic radiation of the particular frequency range.

11. A method of operating an optoelectronic memory device having an information-storage medium therein containing an information-storage layer that can be locally and reversibly switched between at least two optical states by application of electrical fields and that includes a detector layer within the information-storage medium that can detect whether or not an applied electromagnetic radiation beam is transmitted through the information-storage medium at different positions of the information-storage medium, said method comprising:

applying an electric field of a first polarity to a small region of the information-storage layer to induce the first optical state within that region that corresponds to a bit of information having a first binary value;

applying an electric field of a second polarity to the small region of the information-storage layer to induce the second optical state within that region that corresponds to a bit of information having a second binary value; and wherein the information-storage layer comprises a two-dimensional optical state-change organic polymer having a relatively rigid, fused-ring, organic-dye-based planar network and acetylene-linked rotatable molecular components therein.

12. The method of claim 11, wherein the rotatable molecular components can be stably oriented in a rotational position coplanar with the relatively rigid, fused-ring, organic-dye-based planar network, leading to a fully conjugated organic-dye-based two-dimensional polymer that absorbs and or reflects electromagnetic radiation of a particular frequency range; and wherein the rotatable molecular components can be stably oriented in a rotational position approximately orthogonal to the relatively rigid, fused-ring, organic-dye-based planar network, leading to a not-fully conjugated organic-dye-based two-dimensional polymer that is transparent to electromagnetic radiation of the particular frequency range.

* * * * *